United States Patent [19]
Kataoka et al.

[11] Patent Number: 5,857,021
[45] Date of Patent: Jan. 5, 1999

[54] SECURITY SYSTEM FOR PROTECTING INFORMATION STORED IN PORTABLE STORAGE MEDIA

[75] Inventors: Satoshi Kataoka; Makoto Yoshioka; Kenichi Utsumi; Keiichi Murakami, all of Kawasaki, Japan

[73] Assignee: Fujitsu Ltd., Kawasak, Japan

[21] Appl. No.: 728,856

[22] Filed: Oct. 10, 1996

[30] Foreign Application Priority Data

Nov. 7, 1995 [JP] Japan .................................. 7-289009
Nov. 7, 1995 [JP] Japan .................................. 7-289011

[51] Int. Cl.$^6$ .................................................. H04L 9/00
[52] U.S. Cl. ................................................. 380/4; 380/25
[58] Field of Search ............................ 380/3, 4, 23, 25

[56] References Cited

U.S. PATENT DOCUMENTS

| | | |
|---|---|---|
| 5,058,162 | 10/1991 | Santon et al. . |
| 5,291,598 | 3/1994 | Grundy . |
| 5,319,705 | 6/1994 | Halter et al. . |
| 5,379,433 | 1/1995 | Yamagishi ................................... 380/4 |
| 5,469,564 | 11/1995 | Junya .......................................... 380/4 |
| 5,490,216 | 2/1996 | Richardson ................................. 380/4 |
| 5,533,125 | 7/1996 | Bensimon et al. .......................... 380/4 |
| 5,555,304 | 9/1996 | Hasebe et al. .............................. 380/4 |
| 5,682,428 | 10/1997 | Johnson .................................... 380/23 |
| 5,715,313 | 2/1998 | Tsukuda et al. ............................ 380/4 |
| 5,727,061 | 3/1998 | Johnson et al. ............................ 380/4 |
| 5,774,545 | 6/1998 | Raghavachari ............................. 380/4 |
| 5,778,068 | 7/1998 | Johnson et al. ............................ 380/4 |

FOREIGN PATENT DOCUMENTS

| | | |
|---|---|---|
| 0 302 710 A | 2/1989 | European Pat. Off. . |
| 0 561 685 A | 9/1993 | European Pat. Off. . |
| 0 679 980 A | 11/1995 | European Pat. Off. . |

OTHER PUBLICATIONS

Sekine, et al., "80 Gbit/s WDM Dispersion . . . Re–circulating Loop", pp. 480–481 (Aug. 15, 1995).

Naito, et al., "Chromatic Dispersion . . . Transmission Systems", p. 370 (Aug. 15, 1995).

Akasaka, et al., "Reduction of FWM . . . WDM Transmission", p. 371 (Aug. 15, 1995).

Kikuchi, et al., "Fiber Nonlinearity . . . Fiber Transmission", p. 390 (Aug. 15, 1995).

*Primary Examiner*—David Cain
*Attorney, Agent, or Firm*—Staas & Halsey

[57] ABSTRACT

A security system for protecting information stored in portable storage media by checking identifiers assigned to each medium, system, and terminal. Medium IDs are identifiers written by manufacturers of the storage media. System IDs, or corporate IDs, are assigned to enterprise-wide computer systems each consisting of a host computer and terminals. Terminal IDs are affixed to the respective terminals. Data is stored in the media in encrypted form. The security system checks the validity of the medium ID, system ID, and terminal ID, manages before allowing the user to perform any data access, thus protecting the contents from unauthorized access. The security system also writes permission data into each storage medium to manage the decryption of encrypted data stored therein. The permission data contains an encrypted key which is necessary for decrypting the data, and the key can be decoded only with a valid medium ID and unit ID, thus protecting the data in the medium against any attempt to decrypt it with unqualified equipment.

14 Claims, 13 Drawing Sheets

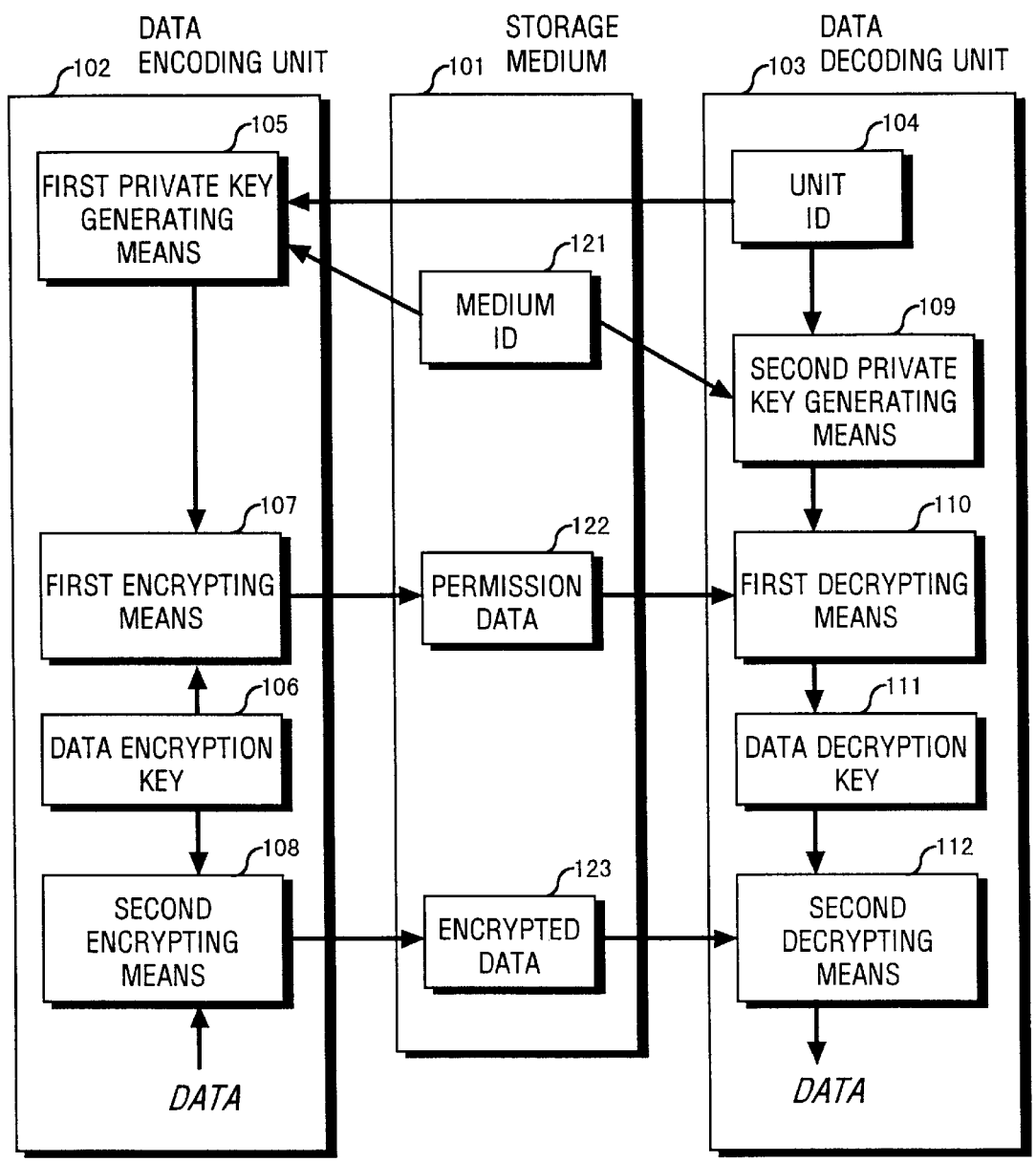

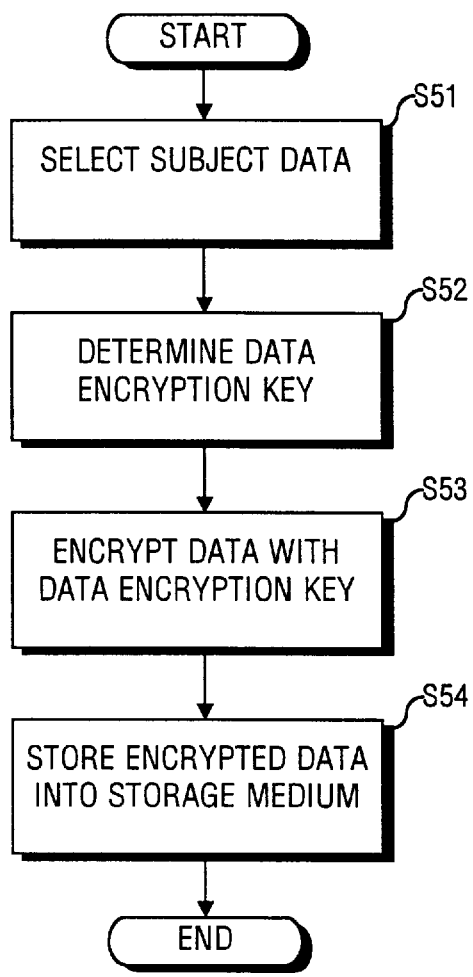

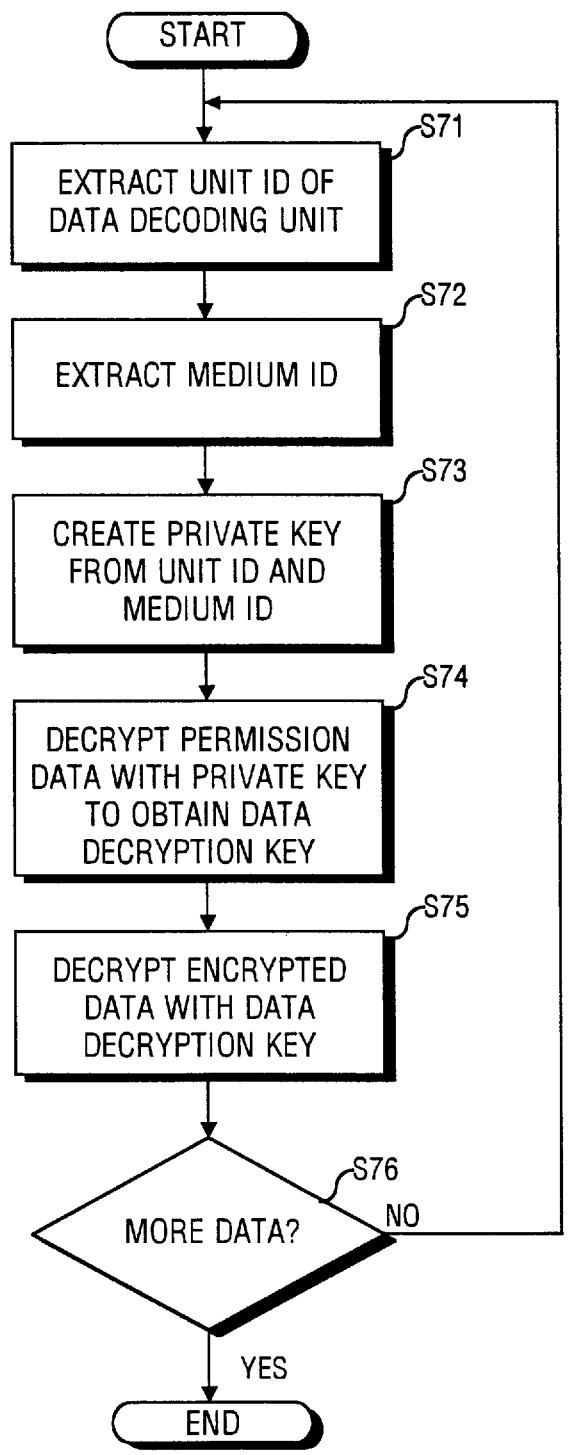

SECURITY SYSTEM FOR PROTECTING INFORMATION STORED IN PORTABLE STORAGE MEDIA

BACKGROUND OF THE INVENTION

1. Field of the Invention

The present invention relates to a security system for protecting information stored in portable storage media, and more specifically, to a security system for protecting information stored in portable storage media by validating identifiers written in the storage media. The present invention also relates to a security system for protecting data stored in portable storage media by using cryptography.

2. Description of the Related Art

Today's mass storage device technologies allow a large amount of information to be stored into a handy storage medium, and new high-capacity media, such as magneto-optical (MO) disks, are used for delivering data and programs on an off-line basis. In business computer systems in which a plurality of terminals are connected to a host computer via communications networks, executive programs for the terminals, as well as data processed in daily jobs, are stored in those portable storage media and transported from headquarters to terminals or vice versa. Besides being capable of storing large-volume files, they are easy to carry, store, and use.

In business activities, however, data security will be a serious concern because of a confidential nature of the contents of data files. Since there is always a risk that such important storage media might be lost or stolen in transit, password protection techniques are commonly used to protect information in the media from unauthorized access and to ensure reliable delivery. A password, or a uniquely defined identifier, is previously written into the storage media, and a user attempting access to the contents will be required to enter the correct password.

This conventional password protection is simple and easy to implement, but it should be noted that such a password is also a potential subject of theft and illegal use. Particularly in the case that data and a program for its retrieval are packaged in the same medium, the data will be exposed to more serious risk and threats, since any terminal equipment can be used for retrieving the data. Therefore, there has long been a demand for more reliable security systems to protect information in storage media from unauthorized access and to ensure safe delivery.

SUMMARY OF THE INVENTION

Taking the above into consideration, an object of the present invention is to provide a reliable security system for protecting information stored in portable storage media to ensure safe delivery.

Another object of the present invention is to provide a reliable security system for protecting data encrypted and stored in portable storage media by only permitting qualified terminals to retrieve and decode the encrypted data.

To accomplish the above objects, according to the present invention, there is provided a security system for protecting data stored in a storage medium. This security system comprises an individual identifier, a terminal identifier, and security control means.

The individual identifier is an identifier previously written into the storage medium. The terminal identifier is an identifier uniquely assigned to the terminal. The security control means permits the terminal to make access to the data in the storage medium, only when the individual identifier extracted from the storage medium and the terminal identifier extracted from the terminal are both valid.

To accomplish the above objects, there is provided another security system for protecting information stored in storage media. This security system comprises a storage medium and a security control unit. The storage medium is a portable medium for storing information. The storage medium has a medium identifier uniquely assigned thereto. The security control unit is used for reading and writing the information in the storage medium, and it also has a unit identifier uniquely assigned thereto.

The security control unit comprises four elements. First private key generating means generates a private key based on the medium identifier extracted from the storage medium and the unit identifier, when the security control unit attempts to write data into the storage medium. First encrypting means produces permission data by encrypting a data encryption key with the private key generated by the first private key generating means, and it writes the permission data into the storage medium. Second encrypting means encrypts the data with the data encryption key, and writes the encrypted data into the storage medium. When the security control unit attempts to retrieve the encrypted data written in the storage medium, second private key generating means regenerates the private key based on the medium identifier extracted from the storage medium and the unit identifier. First decrypting means produces a data decryption key by decrypting the permission data extracted from the storage medium, with the private key regenerated by the second private key generating means. Second decrypting means decrypts the encrypted data extracted from the storage medium, with the data decryption key produced by the first decrypting means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 9 is a diagram showing the structure of a security system in a second embodiment of the present invention;

FIG. 11 is a flowchart showing a process of encrypting subject data;

FIG. 13 is a flowchart showing a process of decrypting stored data.

DESCRIPTION OF THE PREFERRED EMBODIMENTS

Two embodiments of the present invention will be described below with reference to the accompanying drawings.

At the outset, a first embodiment will be described with reference to FIGS. 1 to 8.

Figure 1:
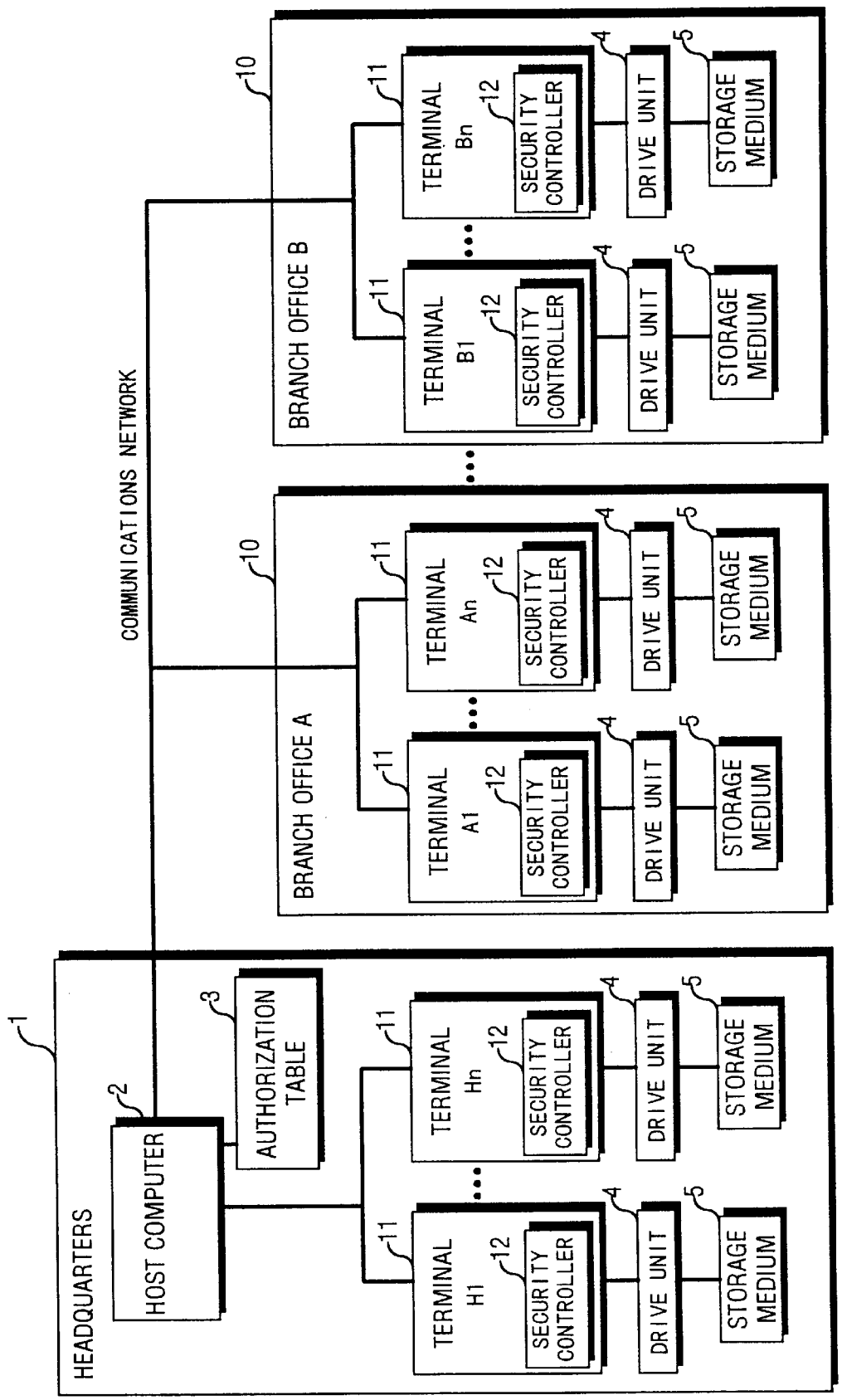
FIG. 1 is a diagram showing the structure of a computer system employing a security system in a first embodiment of the present invention.

FIG. 1 shows the overall structure of a computer system employing a security system in the first embodiment of the present invention. In this business computing system to provide banking services, for example, a host computer 2 situated at headquarters 1 has a plurality of local terminals. Via data communication networks, the host computer 2 are connected to the company's branch offices 10, where a plurality of terminals are situated. The control of those local and remote terminals 11 is concentrated in the host computer 2, where an authorization table 3 provides information for qualifying system administrators and users.

Each terminal 11 communicates with the host computer 2 to perform business transactions, reading and writing data from/to a storage medium 5 through a drive unit 4. A security controller 12 controls access to the contents as well as supervising data encryption processes performed when data is written into the storage medium 5.

The storage medium 5 stores data and programs in encrypted form, along with some security control information described later on. Magneto-optical (MO) disks and other rewritable portable media are suitable for the storage medium 5. The drive unit 4 is a hardware device to write and read data in such a storage medium 5.

The following description will explain in detail about operation of the security system of the first embodiment.

Figure 2:
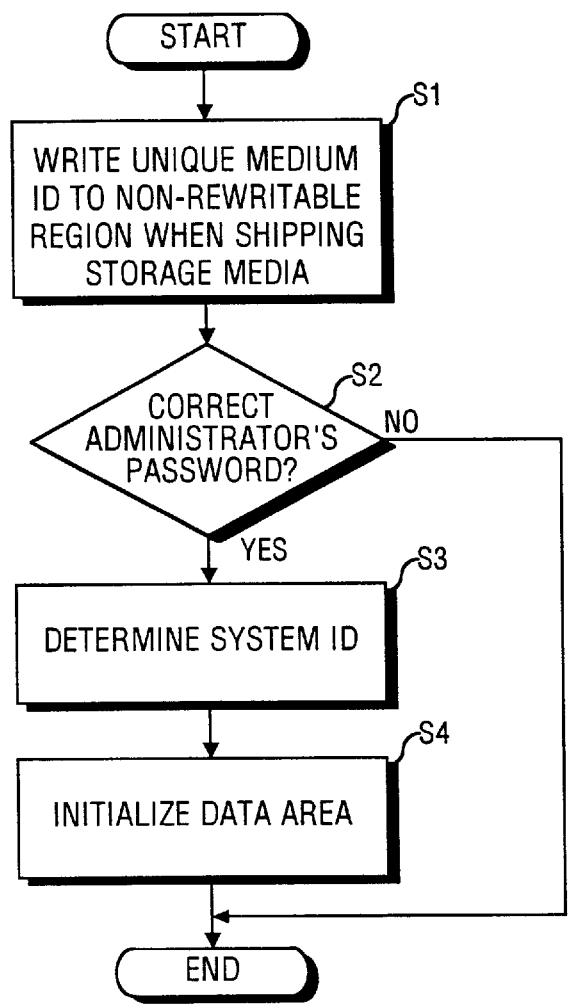
FIG. 2 is a flowchart showing a process of authorizing storage media.

FIG. 2 is a flowchart showing a process of authorizing storage media. In the present invention, every storage medium 5 has to be initialized so as to contain some security information. The process takes the following four steps.

[S1] A unique medium identifier (ID) is written, or burned in a permanent manner, into a non-rewritable region of the storage medium 5 (e.g., an MO disk) with a laser beam. This step S1 is performed by the manufacturer of the storage medium 5 before shipment. The permanent medium ID makes it difficult to forge the storage medium 5.

[S2] Referring to the authorization table 3, the security controller 12 examines whether a correct administrator's password is entered or not. For example, when an operator in the headquarters 1 has inserted a new medium to the drive unit 4 of the terminal 11, the security controller 12 will request him/her to enter a user ID and a password. If the entered password is found in the authorization table 3 as an authorized administrator who has powers to initialize media, the process advances to the next step S3. Otherwise, the process is terminated.

[S3] Now that the operator is authorized, the security controller 12 determines a unique ID to identify the computer system in which the storage medium 5 can circulate. This enterprise-specific identifier is referred to as a system ID or corporate ID. For example, a corporate ID for "Bank AAA" is selected for this purpose.

[S4] The system ID (corporate ID) determined in step S3 is written into the storage medium 5, and other data area for terminal IDs and encrypted data (described later) are then initialized.

Through the above-described process, the storage medium 5 has acquired a proper format as an "authorized medium" for future use in branch offices in a specific corporation.

Figure 3:
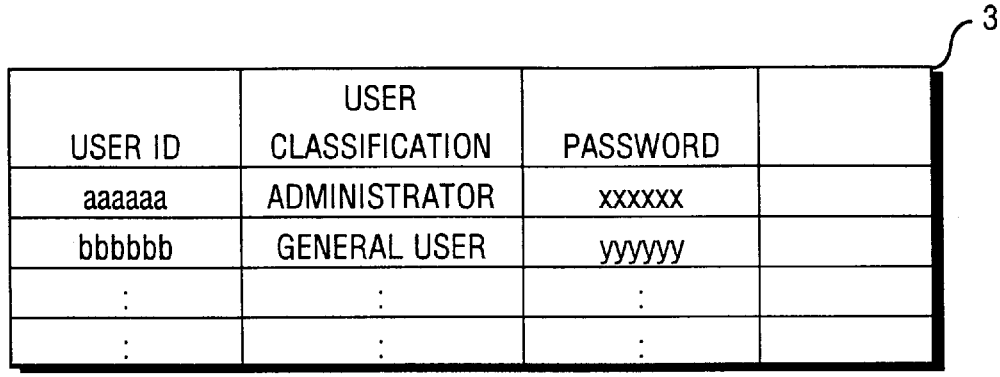
FIG. 3 is a diagram illustrating an authorization table.

FIG. 3 illustrates the authorization table 3 used in the present embodiment. Each entry of the authorization table 3 contains a user ID, user classification, a password, and so forth, which are registered previously. User classification data qualifies the users by classifying them into system administrators, ordinary users, and others, for defining their job responsibilities and access rights to stored data. In step S2 in the flowchart of FIG. 2, the security system refers to this authorization table 3 to retrieve user qualification data and a registered password corresponding to the user ID entered by the user. If the retrieved user qualification data shows that the user is an administrator, and if the entered password agrees with the registered one, the user will be allowed to proceed to steps S3 and S4 for creating authorized storage media.

Figure 4:
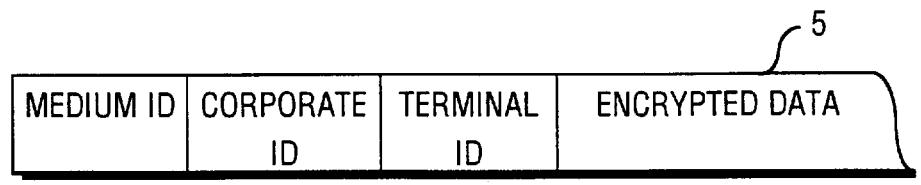
FIG. 4 is a diagram showing data recorded in a storage medium including security control information.

FIG. 4 shows exemplary data recorded in the storage medium, including security control information. The data includes the following information, for example.

Medium ID
Corporate ID
Terminal ID
Encrypted data
Other data

As previously explained, the medium ID is an identifier uniquely assigned by the manufacturer to each medium. The corporate ID is an identifier written by the company operating the computer system. The terminal ID is an optional identifier used to devote the storage medium to a specific terminal. This terminal ID provides a terminal having the designated terminal ID with the privilege to read and write that storage medium.

Figure 5:
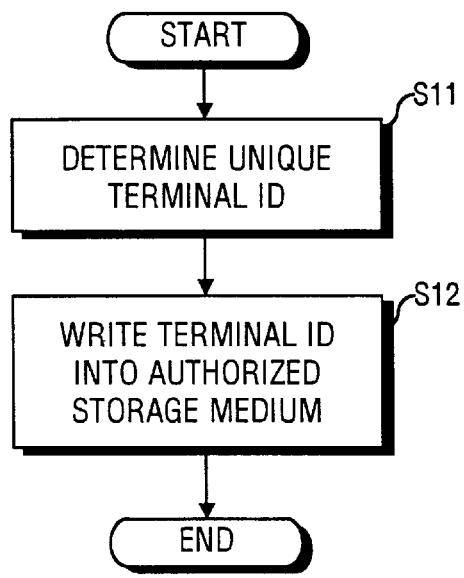
FIG. 5 is a flowchart showing a process of qualifying terminals.

FIG. 5 is a flowchart showing a process to associate the storage medium to a specific terminal by giving the above-described terminal ID. The process takes the following two steps.

[S11] An administrator in a branch office determines an identifier of a specific terminal that is exclusively allowed to read and write the medium. Each terminal in the branch office is uniquely identified with its unit number, which can be used as a terminal ID. In step S11, the security system accepts the terminal ID determined by the administrator.

[S12] The terminal ID is written into the authorized storage medium to give an exclusive read/write access privilege to the terminal.

Through the above-described process, the authorized storage medium delivered from the headquarters 1 has acquired a terminal ID, so that its contents be accessible only to a specific terminal qualified by checking coincidence of the IDs. The corporate ID also serves for qualification of the computer system that handles the storage media.

Figure 6:
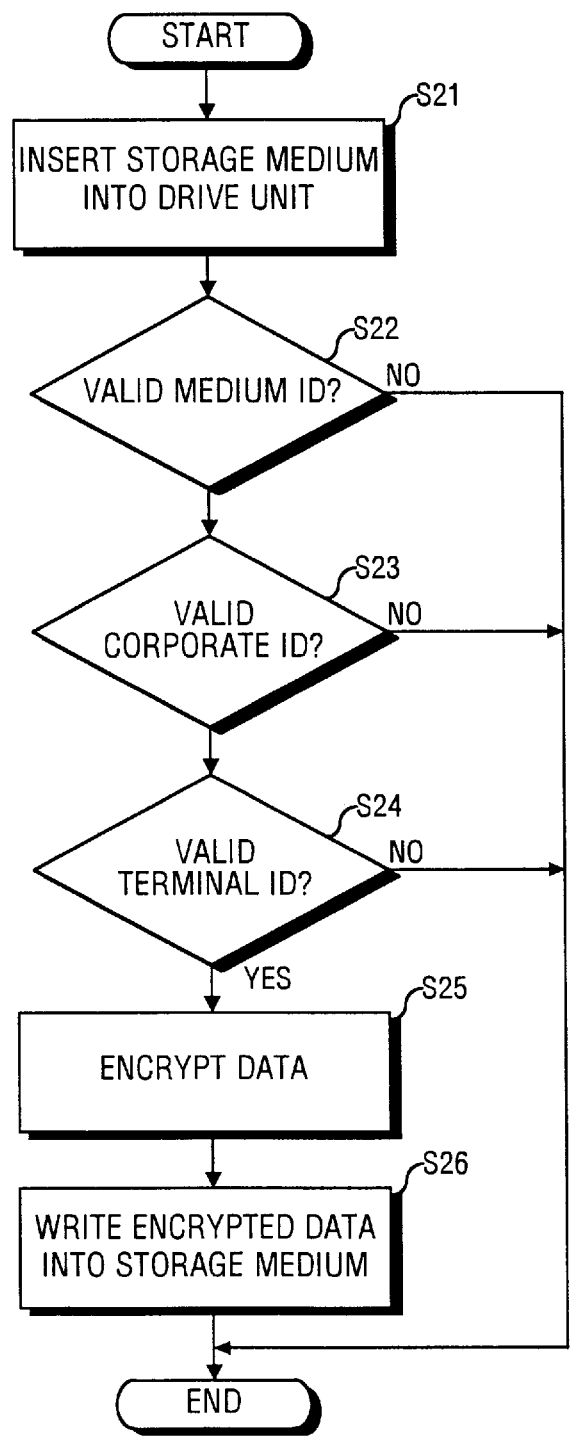
FIG. 6 is a flowchart showing a process of writing data into a storage medium.

FIG. 6 is a flowchart showing a process of writing data into the authorized storage medium. Assume that an operator in the headquarters 1 or one of the branch offices 11 is now attempting to write data into a storage medium 5. The process takes the following six steps.

[S21] The operator inserts the storage medium 5 into the drive unit 4 of one of the terminals 11.

[S22] In response to the insertion of the storage medium 5, the security controller 12 checks whether or not the storage medium 5 contains a medium ID by searching a predetermined read-only region. If a valid medium ID is found there, the process advances to the next step S23 since it has learned that the medium was produced in a legal manufacturer. If no valid medium ID is found, the process will be terminated, suspecting that the storage medium 5 is illegal one.

[S23] The security controller 12 checks whether or not the storage medium 5 contains a corporate ID. If a valid corporate ID is found, the process advances to the next step S24 since it has learned that the storage medium 5 has been properly processed in the headquarters 1. If no valid corporate ID is found, the process will be terminated.

[S24] The security controller 12 checks whether the terminal has a valid access right or not. Specifically, it is examined whether or not the terminal ID in the security controller 12 or in the storage medium 5 agrees with the identifier of the terminal used. If the terminal has a valid access right, the process advances to the next step S25. If not, the process will be terminated.

[S25] The subject data is encrypted under a known data encryption algorithm such as the Data Encryption Standard (DES).

[S26] The encrypted data is written into the storage medium 5.

Through the above-described process, the data can be written into the storage medium 5, only in the condition that the storage medium 5 has a correct medium ID and corporate ID and the terminal has a valid access right to the storage medium 5.

Figure 7:
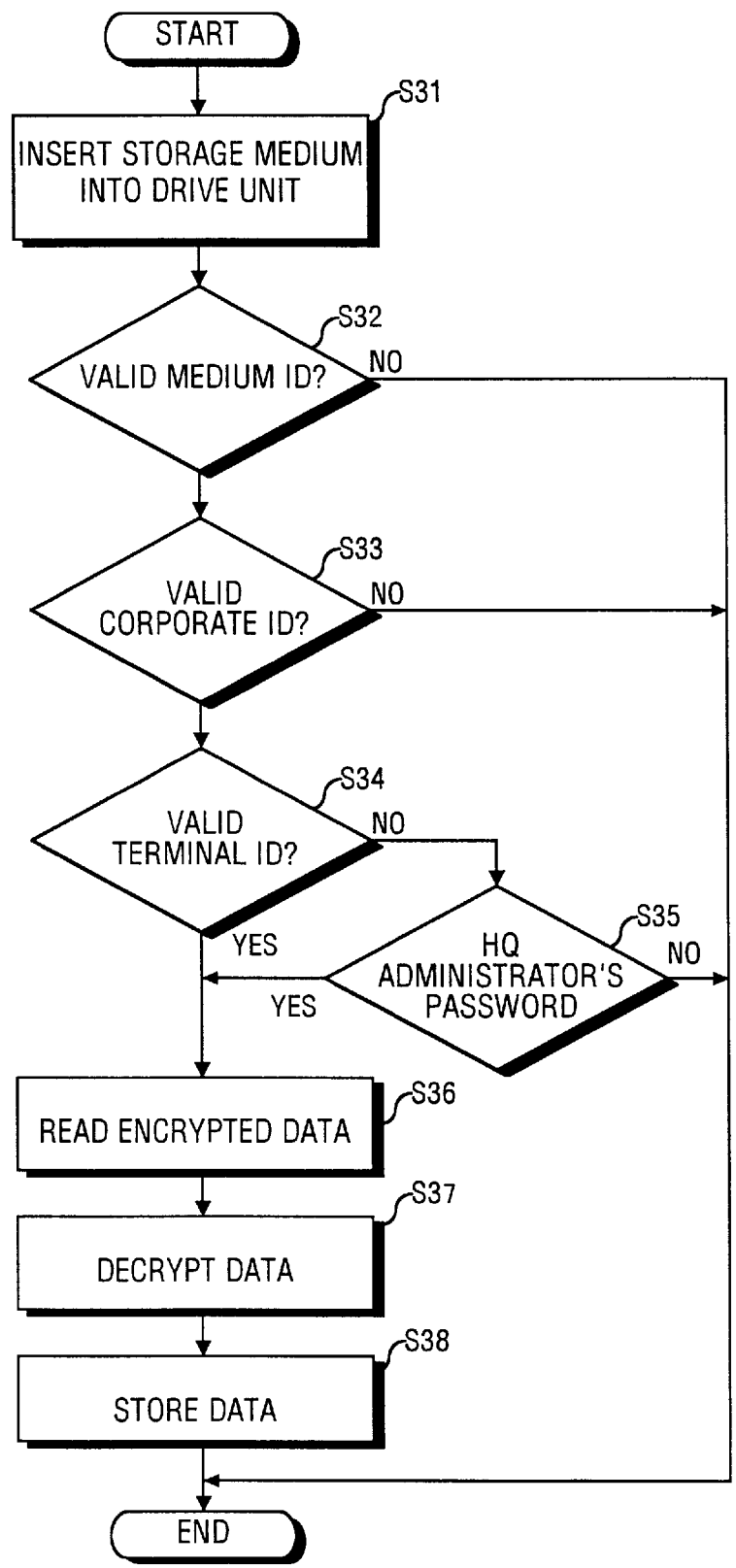
FIG. 7 is a flowchart showing a process of reading data from a storage medium.

Next, a process to read out data encrypted in a storage medium. FIG. 7 is a flowchart showing this data reading process in such a situation that an operator in the headquarters 1 or one of the branch offices 11 is now attempting to retrieve data from the storage medium 5. The process takes the following eight steps.

[S31] The operator inserts the storage medium 5 into the drive unit 4 of one of the terminals 11.

[S32] In response to the insertion of the storage medium 5, the security controller 12 examines whether or not the storage medium 5 contains a medium ID by searching a predetermined read-only region. If a valid medium ID is found, the process advances to the next step S33 since it has learned that the medium has been produced in a legal manufacturer. If no valid medium ID is found, the process will be terminated, suspecting that the storage medium 5 is illegal one.

[S33] The security controller 12 checks whether or not the storage medium 5 contains a corporate ID. If a valid corporate ID is found, the process advances to the next step S34 since it is learned that the storage medium 5 has been properly processed in the headquarters 1. If no valid corporate ID is found, the process will be terminated.

[S34] The security controller 12 checks whether the terminal has a valid access right or not. Specifically, it is examined whether or not the terminal ID in the security controller 12 or in the storage medium 5 agrees with the identifier of the terminal used. If the terminal has a valid access right, the process advances to step S36. If not, the process proceeds to step S35.

[S35] The lack of consistency of terminal ID found in step S34 may be compensated by a valid password of a system administrator in the headquarters 1. Step S35 tests whether such an administrator's password is entered or not. If the entered password is valid, the process proceeds to step S36. If no password is entered or the entered password is not valid, the process is terminated.

[S36] The data, which is stored in encrypted form, is read out from the storage medium 5

[S37] The data is decoded, or decrypted.

[S38] The decoded data is stored in a local storage unit in the terminal.

The security controller 12 is actually implemented as a software program executed in each terminal, which is referred to as a security control program. The present invention provides protection for this important security control program.

Figure 8:
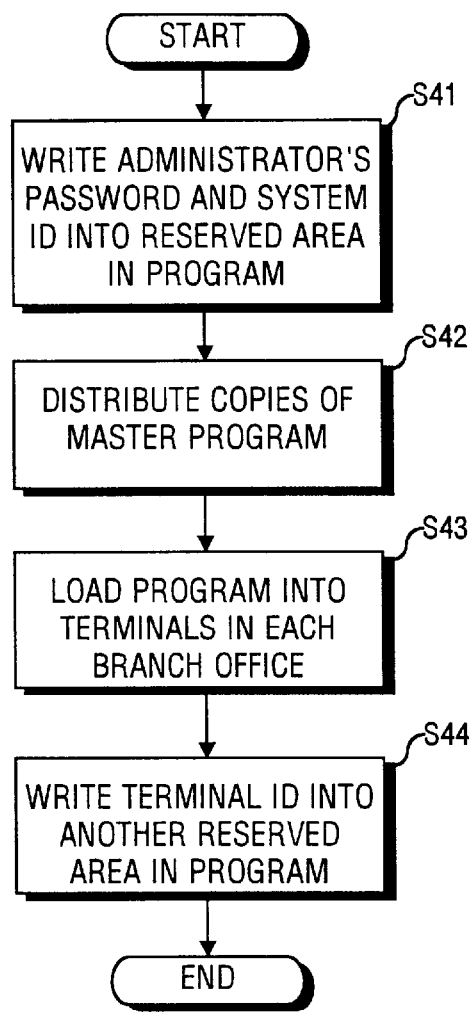
FIG. 8 is a flowchart showing a process of installing a security control program to a terminal.

FIG. 8 is a flowchart showing a process of installing a security control program into a terminal. This process protects the security control program from being installed in or executed in non-authorized terminals, thus avoiding illegal access to the contents of the storage medium 5. The process takes the following four steps.

[S41] The administrator's password and corporate ID are written into a reserved area in the security control program. The program with this additional protection information will be used as a "master program" for later distribution.

[S42] Copies of the master program are distributed to the branch offices.

[S43] The delivered security control program is installed into every terminal in each branch office.

[S44] In each terminal, its unique terminal ID is written into another reserved area in the security control program stored in a local storage unit in the terminal.

Through the above-described process, the security control program is customized for exclusive use in that terminal; that is, the control program will not work even if it is copied and installed in other terminals. When started, the security control program compares between its own terminal ID and the actual ID of the terminal and will abort itself if they do not agree with each other.

Once the security control program is installed and customized for each terminal, its future reinstallation is also restricted. Storage media used for reinstallation or program update must have a terminal ID registry that coincides with the actual terminal ID indicated by the terminal in use. If this comparison failed, the reinstallation of the security control program will be rejected.

The above-described first embodiment will be summarized as follows. The security system according to the present invention permits access to storage media (i.e., to read or write encrypted data stored therein) only when the storage media contain a valid medium ID, corporate ID, and terminal ID. The terminal ID allows a specific terminal to use the storage media and security control program in an exclusive manner. Any inconsistency detected in the medium ID, corporate ID, and terminal ID will terminate the processes for reading and writing data or installing program, thus protecting the confidential information from illegal access, theft, and other risk and threats.

Next, a second embodiment of the present invention will be described below with reference to FIGS. 9 to 13, which provides a reliable security system for protecting data encrypted and stored in portable storage media by permitting only qualified terminals to retrieve and decode the encrypted data.

FIG. 9 shows the structure of a security system in the second embodiment of the present invention. In FIG. 9 a storage medium 101 is a portable mass storage medium to store encrypted data along with some security control information including a unique medium ID and permission data. Magneto-optical (MO) disks are suitable for the storage medium 5.

A medium ID 121 is an identifier uniquely assigned to the storage medium 101, which is burned into a predetermined region in a non-rewritable manner with a laser beam, for example. This permanent medium ID makes it difficult to forge the storage medium 101. Permission data 122 is actually a data encryption key 106 encrypted with a private key. Encrypted data 123 is data encrypted with the data encryption key 106 through a data encryption algorithm such as the DES.

A data encoding unit 102 comprises first private key generating means 105, first encrypting means 107, and second encrypting means 108 to encrypt data and an encryption key.

The first private key generating means 105 generates a private key, based on the medium ID 121 extracted from the storage medium 101 and a unit ID 104. The unit ID 104 is a unique identifier of the computer system itself or that of a portable drive unit (e.g., an MO drive). While the former identifier is normally used as the unit ID 104, the latter may be useful in some situations such as system installation or maintenance, because it is possible to install programs, set up data, and modify data using the same drive unit and storage medium for different computer systems. The first encrypting means 107 encrypts the data encryption key 106 with the private key generated by the first private key generating means 105. The encrypted encryption key is written into the storage medium 101 as the aforementioned permission data 122. The second encrypting means 108 encrypts the data with the data encryption key 106 and writes the encrypted data into the storage medium 101 as the aforementioned encrypted data 123.

A data decoding unit 103 comprises second private key generating means 109, first decrypting means 110, and second decrypting means 112, to decrypt data out of the medium ID 121, permission data 122 and encrypted data 123.

The second private key generating means 109 generates a private key, based on the medium ID 121 extracted from the storage medium 101 and the unit ID 104. To obtain a data decryption key 111, the first decrypting means 110 decrypts the permission data 122 in the storage medium 101, using the private key generated by the second private key generating means 109. The second decrypting means 112 decrypts the encrypted data 123 with the data decryption key 111 generated by the first decrypting means 110.

Figure 10A:
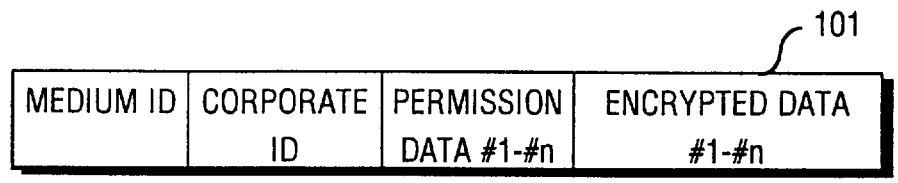
FIGS. 10(A) and 10(B) are diagrams showing the structure of information recorded in a storage medium.
Figure 10B:
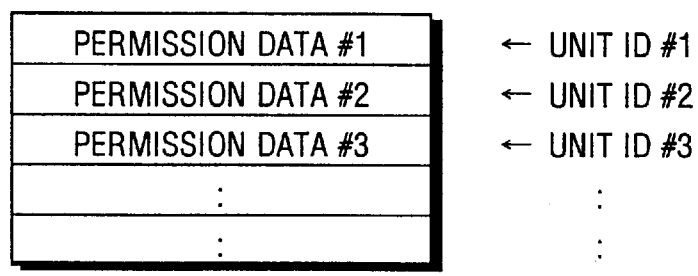

FIGS. 10(A) and 10(B) show the structure of information recorded in the storage medium 101. As FIG. 10(A) specifically shows, the information includes:

Medium ID

Corporate ID

Permission data #1–#n

Encrypted data #1–#n

As previously explained, the medium ID is an identifier uniquely burned into each medium with a laser beam or the like, which ID prevents the medium from being forged. The corporate ID is an identifier uniquely assigned to each company to distinguish their computer systems from each other. The permission data #1–#n and encrypted data #1–#n are prepared for a plurality of units (n units). When writing the same data set or installing the same program into a plurality of units, n-set of permission data should be stored in the storage medium 101. In this case, a plurality of permission data correspond to a single set of decrypted data.

FIG. 10(B) schematically shows association between the permission data and unit IDs. As seen in FIG. 9, the permission data 122 derives from the unit ID 104 and medium ID 121, and therefore it will have different values for different unit IDs. FIG. 10(B) shows how the permission data #1, #2, #3, etc. correspond to the different unit IDs #1, #2, #3, etc.

Next, a process to generate the encrypted data 123 will be described in detail with reference to FIG. 11.

FIG. 11 is a flowchart showing a process of encrypting storage data. The process takes the following four steps.

[S51] Data is selected for encryption.

[S52] A data encryption key 106 is determined.

[S53] The second encrypting means 108 encrypts the selected data with the data encryption key 106.

[S54] The encrypted data 123 is stored into the storage medium 101.

Next, a process to generate the permission data 122 will be described in detail with reference to FIG. 12.

Figure 12:
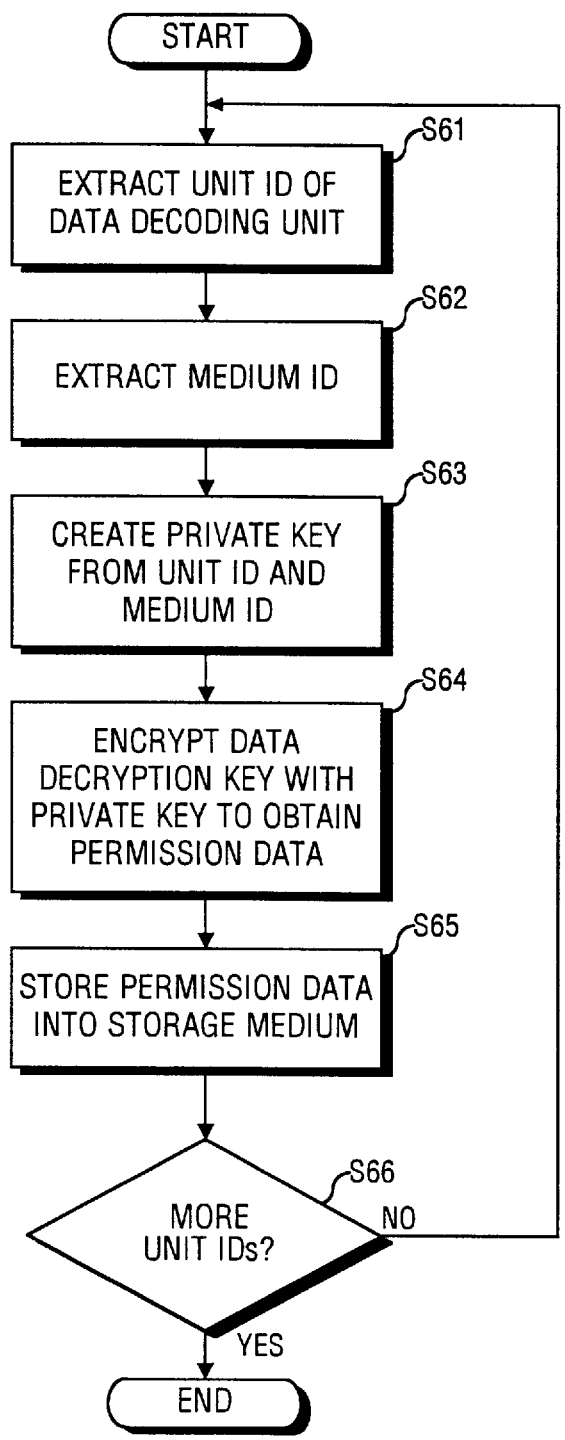
FIG. 12 is a flowchart showing a process of creating permission data.

FIG. 12 is a flowchart showing a process of creating the permission data 122. The process takes the following six steps.

[S61] The first private key generating means 105 extracts the unit ID 104 from the data decoding unit 103.

[S62] The first private key generating means 105 extracts the medium ID 121 from the storage medium 101.

[S63] The first private key generating means 105 creates a private key from the unit ID 104 and medium ID 121 extracted in steps S61 and S62, respectively.

[S64] The first encrypting means 107 encrypts the data decryption key 106 with the private key to produce permission data 122.

[S65] The permission data 122 is stored into the storage medium 101.

[S66] It is tested whether all the available unit IDs have been processed or not. If all the unit IDs are finished, then the process ends. Otherwise, the process returns to step S61 for the next unit ID.

Lastly, a process to decrypt the stored data will be described below with reference to FIG. 13.

FIG. 13 is a flowchart showing a process of decrypting the encrypted data 123. The process takes the following six steps.

[S71] The second private key generating means 109 extracts the unit ID 104 of the data decoding unit 103.

[S72] The second private key generating means 109 extracts the medium ID 121 from the storage medium 101.

[S73] The second private key generating means 109 creates a private key from the unit ID 104 and medium ID 121 extracted in step S71 and S72, respectively.

[S74] The first decrypting means 110 decrypts the permission data 122 with the private key to retrieve a data decryption key 111.

[S75] The second decrypting means 112 extracts original data from the encrypted data 123 by decrypting it with the data decryption key 111.

[S76] It is tested whether all the available encrypted data have been processed or not. If all the data are finished, the process ends. Otherwise, the process returns to step S74 for the next data.

The above discussion about the second embodiment will be summarized as follows. According to the present invention, the security system encrypts both original data and its permission data by using a unit ID, medium ID, and a data encryption key and stores them into the storage media. Only the units having relevant unit IDs can retrieve the original data, thus protecting the stored data from illegal access.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A security system for protecting data stored in a storage medium, the security system comprising:
   an individual identifier previously written into the storage medium;
   a first terminal identifier uniquely assigned to a terminal that is authorized to make access to the data in the storage medium;
   a second terminal identifier previously written into the storage medium by duplicating said first terminal identifier; and
   security control means for permitting the terminal to access the data in the storage medium only when said individual identifier extracted from said storage medium is valid and said first terminal identifier of the terminal agrees with said second terminal identifier extracted from the storage medium.

2. A security system according to claim 1, wherein said security control means is disposed in the terminal.

3. A security system according to claim 1, wherein said security control means is disposed in a security control program of the terminal.

4. A security system according to claim 1, wherein the data is encrypted or decrypted when said individual identifier extracted from the storage medium is valid and said first terminal identifier of the terminal agrees with said second terminal identifier extracted from the storage medium.

5. A security system according to claim 1, wherein the data is encrypted or decrypted when said individual identifier and a user identifier are both valid, and said first terminal identifier of the terminal agrees with said second terminal identifier extracted from the storage medium.

6. A security system according to claim 1, wherein said individual identifier is a medium identifier uniquely assigned to the storage medium.

7. A security system according to claim 1, wherein said individual identifier is a system identifier uniquely assigned to the computer system.

8. A security system according to claim 1, which permits a security control program to be installed into the terminal only when a medium identifier uniquely assigned to the storage medium is valid and said first terminal identifier of the terminal agrees with said second terminal identifier extracted from the storage medium.

9. A security system for protecting information stored in a storage medium, comprising:
   a portable storage medium storing information, having a medium identifier uniquely assigned thereto; and
   a computer unit, having a unit identifier, reading and writing the information in said storage medium, comprising:
      first encrypting means for writing permission data into said storage medium in encrypted form, permission data being produced through encryption by using the medium identifier extracted from said storage medium, the unit identifier, and a data encryption key,
      second encrypting means for encrypting data with the data encryption key and writing encrypted data into the storage medium,
      first decrypting means for, when said computer unit attempts to retrieve the encrypted data written in said storage medium, producing a data decryption key through decryption by using the permission data and the medium identifier extracted from said storage medium, and the unit identifier, and
      second decrypting means for decrypting the encrypted data extracted from said storage medium with the data decryption key produced by said first decrypting means.

10. A security system for protecting information stored in a storage medium, comprising:
    a portable storage medium storing information, having a medium identifier uniquely assigned thereto; and
    a computer unit, having a unit identifier, for reading and writing the information in said storage medium, comprising:
       first private key generating means for generating a private key based on the medium identifier extracted from said storage medium and the unit identifier, when said computer unit attempts to write data into said storage medium,
       first encrypting means for producing permission data by encrypting a data encryption key with the private key generated by said first private key generating means, and for writing the permission data into said storage medium,
       second encrypting means for encrypting the data with the data encryption key, and for writing encrypted data into the storage medium,
       second private key generating means for regenerating the private key based on the medium identifier extracted from said storage medium and the unit identifier, when said computer unit attempts to retrieve the encrypted data written in said storage medium,
       first decrypting means for producing a data decryption key by decrypting the permission data extracted from said storage medium, with the private key regenerated by said second private key generating means, and
       second decrypting means for decrypting the encrypted data extracted from said storage medium with the data decryption key produced by said first decrypting means.

11. A security system according to claim 9, wherein said first encrypting means produces a plurality of permission data corresponding to different unit IDs assigned to different security control units and writes the plurality of permission data into said storage medium.

12. A security system according to claim 9, wherein said first encrypting means produces a plurality of permission data corresponding to different data to be encrypted and writes the plurality of permission data into said storage medium.

13. A security system according to claim 9, wherein the unit identifier is uniquely assigned to said computer unit.

14. A security system according to claim 9, wherein the unit identifier is uniquely assigned to a portable drive unit used for reading and writing said storage medium.

* * * * *

UNITED STATES PATENT AND TRADEMARK OFFICE
CERTIFICATE OF CORRECTION

PATENT NO. :   5,857,021
DATED      :   January 5, 1999
INVENTOR(S):   Kataoka et al.

It is certified that error appears in the above-identified patent and that said Letters Patent is hereby corrected as shown below:

Cover Page, [73] "Kawasak," should be --Kawasaki,--.

Signed and Sealed this

Eighth Day of August, 2000

Attest:

Q. TODD DICKINSON

Attesting Officer          Director of Patents and Trademarks